United States Patent [19]

Nomura et al.

[11] 4,263,356
[45] * Apr. 21, 1981

[54] AUTO CEILING PANEL

[75] Inventors: Takao Nomura, Toyota; Tatsuo Sakamoto, Okazaki; Yoshiro Umemoto, Nagoya, all of Japan

[73] Assignee: Toyota Jidosha Kogyo Kabushiki Kaisha, Toyota, Japan

[*] Notice: The portion of the term of this patent subsequent to Dec. 5, 1995, has been disclaimed.

[21] Appl. No.: 930,874

[22] Filed: Aug. 3, 1978

[30] Foreign Application Priority Data

Apr. 10, 1978 [JP] Japan .................. 53-041910

[51] Int. Cl.³ .................. B32B 3/10; B32B 3/26; B62D 25/06
[52] U.S. Cl. .................. 428/138; 181/290; 296/211; 296/214; 428/256; 428/315
[58] Field of Search .................. 181/290; 296/137 A, 296/211–214; 428/131–138, 311, 313, 256, 315; 156/252–306, 219, 245

[56] References Cited

U.S. PATENT DOCUMENTS

| 3,126,978 | 3/1964 | Bergstrom | 181/290 |
| 3,647,588 | 3/1972 | Greig | 428/313 X |
| 3,697,126 | 10/1972 | Tiffin et al. | 428/213 X |
| 3,954,537 | 5/1976 | Alfter et al. | 428/315 X |
| 3,966,526 | 6/1976 | Doerfling | 156/252 X |
| 4,053,341 | 10/1977 | Kleiner et al. | 428/315 X |
| 4,073,991 | 2/1978 | Focht | 428/315 X |
| 4,128,682 | 12/1978 | Nomura et al. | 428/138 |
| 4,128,683 | 12/1978 | Nomura et al. | 428/138 |
| 4,129,672 | 12/1978 | Nomura et al. | 428/138 |

OTHER PUBLICATIONS

P.127 of the Encyclopedia Britannica vol. 1, Encyclopedia Britannica, Inc., William Benton, Publisher Chicago, London, Toronto, Geneva.

Primary Examiner—Henry F. Epstein
Attorney, Agent, or Firm—Brisebois & Kruger

[57] ABSTRACT

An auto ceiling panel takes the form of a laminate composed of a permeable ceiling surface skin, a first layer of porous continuous bubble plastic foam attached to the skin, a second foamed plastic layer with numerous through holes attached to the first layer, and a third foamed plastic layer with through holes of a larger diameter than the holes in the second layer. A metal lath is between the second and third layers, and the second and third layers are fused to the metal lath.

4 Claims, 6 Drawing Figures

AUTO CEILING PANEL

BACKGROUND OF THE INVENTION

1. Field of the Invention

The present invention relates to a highly acoustic auto ceiling panel and its manufacturing process.

2. Description of the Prior Art

The conventional auto ceiling panel represents a three-layer structure of a metal lath held between two foamed polyethylene layers with isolated bubbles thermally fused thereto or a four-layer one of a metal lath held on both sides between one foamed polyethylene layer with a polyvinylchloride sheet and another foamed polyethylene layer. In such a laminated structure (of three layers or four layers), the heat insulation effect and the safety to human body may be satisfactory enough, but the interior noise insulation effect is not sufficient, because the bubbles of the foamed plastic layers in the structure are not isolated.

It is known that the acoustic performance of auto ceiling panel can be improved by providing through holes in the panel. Provision of through holes in such a structure of three or four layers, however, is hindered by the metal lath held between the foamed polyethylene layers; and this is difficult after lamination.

For these reasons, in the present practice of manufacture the through holes are bored separately in respective foamed polyethylene layers to be plastered together and thereafter these layers are laminated on both sides of the metal lath. Even in this practice, it is difficult to get a lamination with identical pattern on the top and bottom sides, resulting in that a very few holes running through both foamed polyethylene layers are obtained and thus for all the bother of working, the acoustic effect attained is not remarkable.

Related patents of applicants' are U.S. Pat. Nos. 4,128,682, 4,128,683, and 4,129,672.

SUMMARY OF THE INVENTION

The primary object of the present invention is to provide an auto ceiling panel free from the conventional drawback, which excels in the effect of sound absorption within a vehicle.

Another object of the present invention is an auto ceiling panel manufacturing process which permits easy provision of numerous through holes with an acoustic effect.

The other objects of the present invention will become apparent from the following account of the invention.

DETAILED ACCOUNT OF THE INVENTION

An auto ceiling panel according to the present invention is essentially constructed such that on the ceiling side surface of the first foamed plastic layer of continuous bubble type with a porous skin attached to the interior side is plastered the second foamed plastic layer with numerous through holes of small diameter; and on the ceiling surface side of the second foamed plastic layer is the third foamed plastic layer with through holes of a larger diameter than that of ones in the second foamed plastic layer, fused thermally to a metal lath which is inserted between the second and the third foamed plastic layers.

The manufacturing process of the auto ceiling panel according to the present invention essentially comprises the steps of; bonding or thermally fusing a porous skin to the interior side surface of the first foamed plastic layer of continuous bubble or open cell type; boring a large number of through holes of small diameter in the second foamed plastic layer by a punching machine; bonding or thermally fusing the second foamed plastic layer to the ceiling side surface of the first foamed plastic layer; boring through holes of a larger diameter than that of ones in the second foamed plastic layer in the third foamed plastic layer by the punching machine; placing the third foamed plastic layer on the ceiling side surface of the second foamed plastic layer with a metal lath interposed between them; and finally, thermally fusing the second and the third foamed plastic layers to the metal lath.

Next, a practical example of the auto ceiling panel according to the present invention is to be described in detail.

Figure 1:
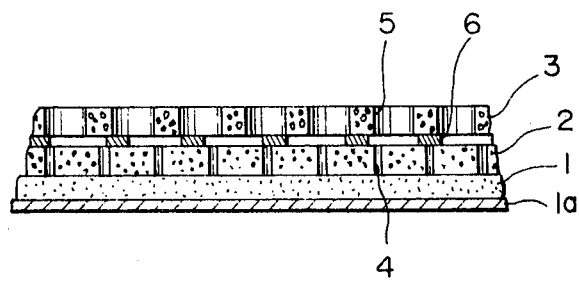
FIG. 1 is a section view of an auto ceiling panel according to the present invention.
Figure 2:
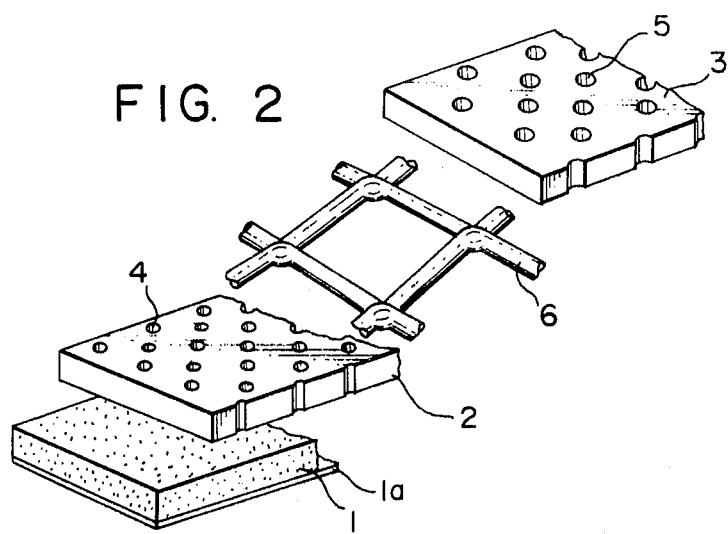
FIG. 2 is an oblique view showing each layer, as separated, of the auto ceiling panel in FIG. 1.

In FIGS. 1 and 2, 1 denotes the first foamed plastic layer of continuous bubble type, on the interior side surface of which is bonded or thermally fused a skin 1a of a knit or woven or nonwoven cloth with permeability. A foamed polyurethane slab 1.0–8.0 mm thick with 0.01–0.05 specific gravity, characterized by being porous and cheap, is found appropriate as the material for the continuous bubble or open cell type foamed plastic layer.

A foamed polyethylene 1.0–4.0 mm thick with 0.02–0.1 specific gravity, characterized by being light and easily available, is found appropriate as the material for the second foamed plastic layer. In the second foamed polyethylene layer 2 a large number of through holes 0.1–5.0 mm in diameter are bored to an open ratio of 0.5–30%. The second foamed plastic layer 2 is bonded or thermally fused to the auto ceiling side of the first foamed plastic layer 1.

A foamed polyethylene 1.0–4.0 mm thick with 0.02–0.01 specific gravity, being light and easily available, is found appropriate as the material for the third foamed plastic layer 3. In the third foamed plastic layer 3 a large number of through holes 5 of 1.0–10 mm diameters, which are larger than the through holes 4 are bored to an open ratio of 1.0–50%.

The third foamed plastic layer 3 is thermally fused to the ceiling side surface of the second foamed plastic layer 2 through the metal lath 6 held between the two. The metal lath is desirably 0.5–1.5 mm thick. If it is less than 0.5 mm thick, the fusion may be imperfect; and if it is more than 1.5 mm, the manufacturing cost will increase.

Figure 3:
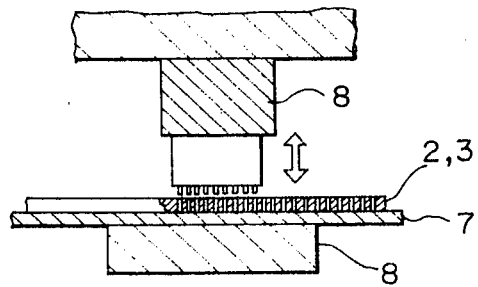
FIG. 3 is a section view illustrating a punching machine to bore holes in the constituent members of said auto ceiling panel, i.e., the second foamed plastic layer and the third foamed plastic layer.
Figure 4:
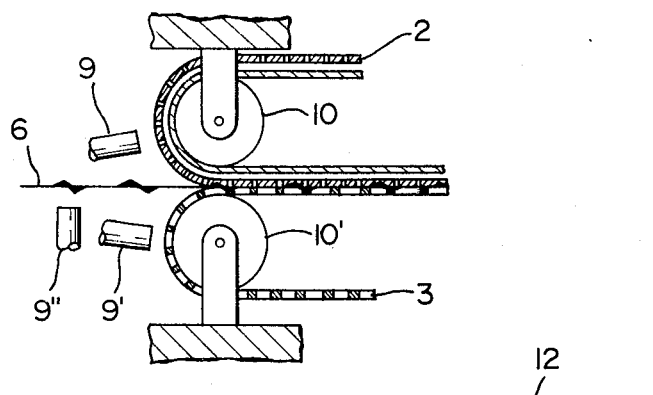
FIG. 4 is a section view illustrating a device to thermally fuse the second and the third foamed plastic layers through a metal lath.
Figure 5:
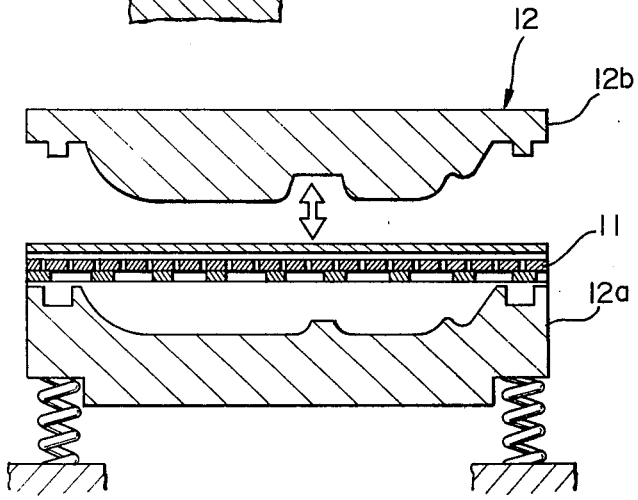
FIG. 5 is a section view illustrating a cold-molding machine to be used in the manufacture of the auto ceiling panel according to the present invention.

Next an example of the manufacturing process of said auto ceiling panel is to be described referring to FIGS. 3 to 5.

First, on the interior side surface of the first foamed plastic layer 1 of continuous bubble type (foamed polyurethane slab, 1.0–8.0 mm thick with specific gravity 0.01–0.05), a porous skin 1a of a knit-, woven- or nonwoven cloth is bonded or thermally fused. Next, through holes 4 of small diameter are bored by a vertical action of the punching machine 8 in the second foamed plastic layer 2 consisting of a 1.0–4.0 mm thick foamed polyethylene (specific gravity 0.02–0.1), as it is being moved on the belt conveyor 7, as shown in FIG. 3. Said small-diameter through holes 4 are bored with a diameter of 0.1–5.0 mm to an open ratio of 0.5–30%. Then on the ceiling side surface of the first foamed plastic layer 1 the second foamed plastic layer 2 is bonded or thermally fused. Thereafter, in the same way as with the second foamed plastic layer 2, through holes 5 of a larger diameter than said through holes 4 are bored in the third foamed plastic layer 3 consisting of a 1.0–4.0 mm thick foamed polyethylene (specific gravity 0.02–0.1). Said through holes 5 have a diameter of 1.0–10 mm and are bored to an open ratio of 1–50%. Next, as illustrated in FIG. 4, the second foamed plastic layer 2 and the third foamed plastic layer 3 are sent, while being heated respectively by the heaters 9,9', to the press rollers 10,10'. Then the metal lath 6 heated by the heater 9" is inserted between the two plastic layers 2, 3; and thereafter by means of the press rollers 10,10' said two plastic layers 2, 3 are thermally fused to the metal lath 6.

A lamination 11 thus obtained of the first foamed plastic layer 1, the second foamed plastic layer 2, the metal lath 6 and the third foamed plastic layer 3 is, as illustrated in FIG. 5, formed by the cold-molding press 12 to a profile fitting the auto ceiling. The forming is done by placing a cut piece of said lamination 11 with the skin 1a upward on the bottom mold 12a, lowering the top mold 12b, and applying a pressure with the edge of the lamination 11 clamped by the female part of the bottom mold 12a and the male part of the top mold 12b so that no wrinkle develops in the product.

Next, the reasons for various numerical definitions in the present invention are explained.

Concerning the thickness of the second foamed plastic layer 2 and the third foamed plastic layer 3—if the value is less than 1.0 mm, the appearance of the product will be spoiled with lath marks; and if it is more than 4.0 mm, the weight and cost of the product will be increased.

Concerning the size of holes to be bored in the foamed plastic layers 2, 3—if the size of holes is less than 0.1 mm in the second foamed plastic layer, the acoustic performance will be poor; and if it is more than 5.0 mm, holes of smaller diameter than ones in the third foamed plastic layer 3 will not be obtained. In the case of the third plastic layer 3, if the size is less than 1.0 mm, a sufficient number of through holes will not be obtained, resulting in a decreased efficiency of sound absorption; and if it is more than 10 mm, defective products will be liable to be obtained in press-molding.

As for the open ratio of holes in the second foamed plastic layer, if the ratio is less than 0.5%, the efficiency of sound absorption will be poor; and if it is more than 30%, the product will be defective in connection with large-diameter holes 5. In the case of the foamed plastic layer 3, if the ratio is less than 1.0%, the efficiency of sound absorption will be poor; and if it is more than 50%, defective products will increase.

The auto ceiling panel thus obtained, with perfect through holes constituted by overlapping of small-diameter holes 4 and large-diameter holes 5, is highly permeable and accordingly excels in the effect of insulating or absorbing the sound.

Figure 6:
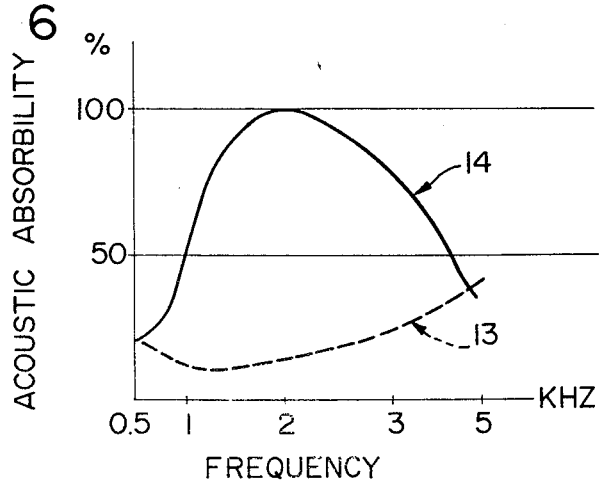
FIG. 6 is a diagram showing the acoustic performance of the auto ceiling panel according to the present invention.

The test results of acoustic performance of the ceiling panel according to the present invention as compared with the conventional one are summarized in FIG. 6. It is notable that the performance of the panel according to the present invention as indicated by the solid line 14 is far superior to that of the conventional one as indicated by the broken line 13.

The panel product according to the present invention is applicable not only as the auto ceiling but also as the auto lining, the wall panel of building and wall material.

The following are various merits of the auto ceiling panel and its manufacturing process according to the present invention.

(a) Since the skin 1a is made of a knit-, woven- or nonwoven cloth, the product has a good appearance.

(b) When a skin 1a of a knit-, woven- or nonwoven cloth is directly bonded to the second foamed plastic layer 2, the appearance of the product is spoiled by the small-diameter through holes 4. According to the present invention, a good appearance of the skin 1a can be maintained without sacrificing the porosity on account of the first foamed plastic layer 1 of continuous bubble type being present between the skin 1a and the second foamed plastic layer 2.

(c) Use of the skin 1a and the first foamed plastic layer contributes to the thickness reduction in the second foamed plastic layer 2, light weight, cost down and easiness of boring.

(d) Holes running through both the layers 2 and 3 can be easily obtained by merely overlapping together the second foamed plastic layer 2 with small-diameter holes 4 and the third foamed plastic layer with large-diameter holes 5. Thus a highly acoustic ceiling panel can be easily obtained.

(e) An auto ceiling panel which is satisfactory in terms of strength with the metal lath 6 free from damage can be obtained, because no fusing of the metal lath 6 is done when holes are bored in the second foamed plastic layer 2 and the third foamed plastic layer 3.

We claim:

1. An auto ceiling panel comprising:
a porous skin having attached thereto a first foamed continuous bubble porous polyurethane slab, having a thickness of 1.0 to 8.0 mm,
a second foamed polyethylene slab attached to the ceiling side of said first slab, said second slab having a thickness of 1.0 to 4.0 mm and a plurality of openings bored therethrough, said openings having each a diameter of 0.1 to 5.0 mm and their total open space amounting to 0.5% to 30% of the total surface area of said second slab,
a metal lath fused to said second slab having a thickness of 0.5 to 1.5 mm, and
a third foamed polyethylene slab fused to said metal lath, said third slab having a thickness of 1.0 to 4.0 mm and a plurality of openings bored therethrough, said openings having each a diameter of 1.0 to 10 mm and their total open space amounting to 1.0 to 50% of the total surface area of said third slab and a majority thereof being in communicating relation relative to the openings in the second slab.

2. The panel of claim 1 wherein said skin is a permeable cloth material.

3. Auto ceiling panel of claim 1, wherein said second foamed plastic layer and said third foamed plastic layer are 0.02–0.1 in specific gravity.

4. Auto ceiling panel of claim 1, wherein said first foamed plastic layer is a foamed polyurethane slab 1.0–8.0 mm thick and 0.01–0.05 in specific gravity.

* * * * *